Dec. 4, 1956      W. R. JONES      2,772,916
VISOR FOR VEHICLES
Filed Aug. 16, 1954
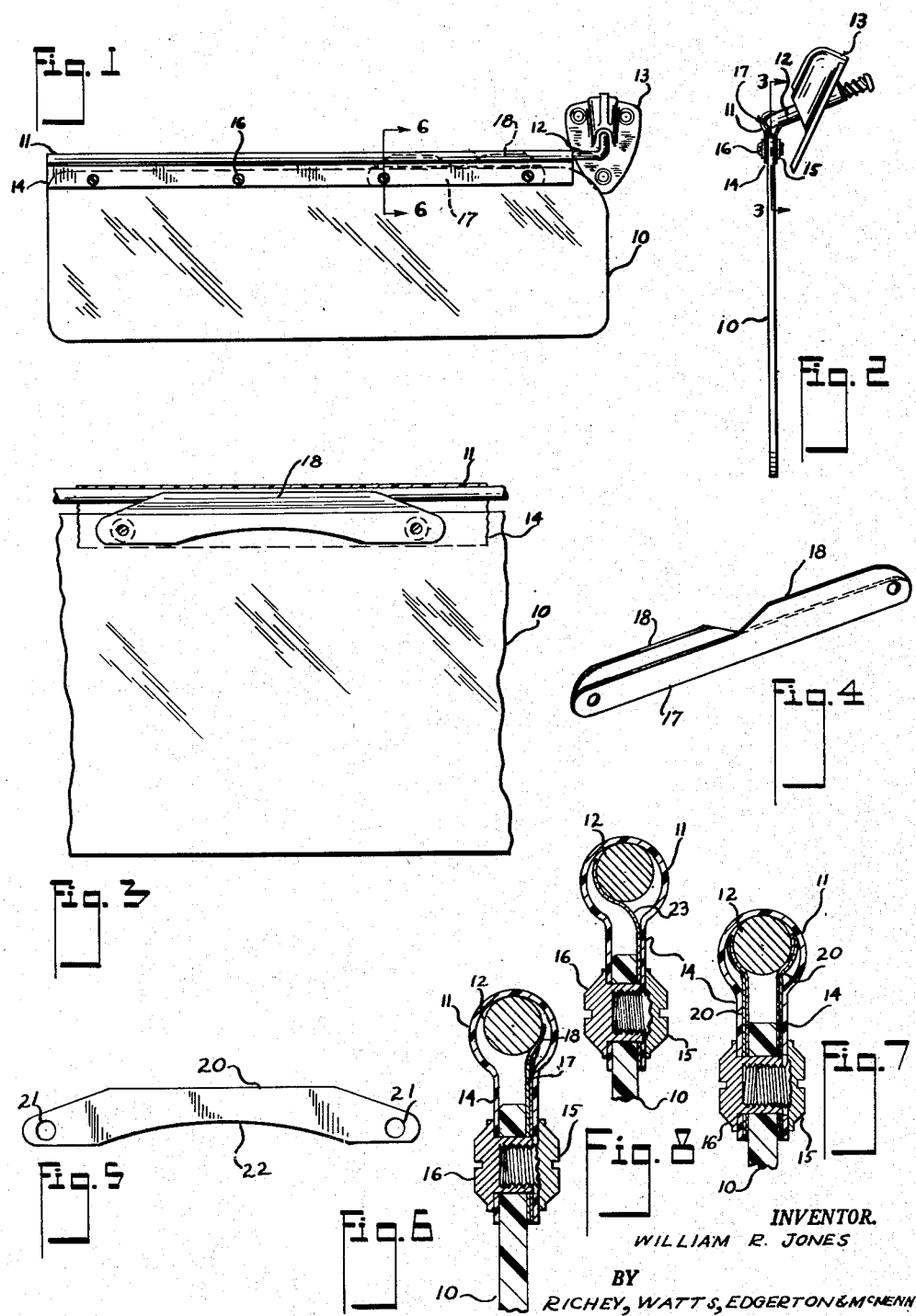
INVENTOR.
WILLIAM R. JONES
BY
RICHEY, WATTS, EDGERTON & McNENNY
A. H. Edgerton
ATTORNEYS

United States Patent Office 2,772,916
Patented Dec. 4, 1956

2,772,916

VISOR FOR VEHICLES

William R. Jones, Cleveland, Ohio, assignor of one-half to George F. Metzger, Cleveland, Ohio Application August 16, 1954, Serial No. 450,099

5 Claims. (Cl. 296—97)

This invention relates broadly to automobile windshield shades and more specifically to an improved frictional clamp for the retention of the shade in adjusted position.

The windshield shade or so-called adjustable sun visor visor contemplated herein is of the type that embodies a plate mounted for pivotal movement about a rod mounted on brackets within the car adjacent the top of the windshield. In some instances the sun shield or plate is arranged for longitudinal adjustment on the rod and the bracket is formed to accommodate horizontal pivotal movement of the rod.

The primary object of the invention resides in the provision of a frictional clamping device designed to resist rotation of the plate about the rod, the structure embodying one or more spring metal strips carried by the plate disposed in tangential impinged relation with one or both sides of the rod throughout a portion of the length thereof.

Another object of the invention is to provide a pair of flat, resilient, relatively thin sheet metal strips disposed in parallel relation with the medial axis of the rod, the outer strip being of a lesser width and arranged to bear against the inner strip.

Further objects reside in the provision of a frictional clamp which is economic of manufacture, efficient of operation, durable and designed to facilitate adjustment of the compressive effort of the spring upon the shade supporting rod.

Other objects and advantages more or less ancillary to the foregoing, and the manner in which all the various objects are realized, will appear in the following description, which sets forth the preferred embodiment of the invention.

Referring to the drawings:

Fig. 1 is a front elevational view of a shade and the supporting frame therefor, the improved clamp being illustrated in dotted lines therein.

Fig. 2 is a side elevational view thereof.

Fig. 3 is a vertical sectional view through the shade and supporting sleeve, the section being taken on a plane indicated by the line 3—3 in Fig. 2.

Fig. 4 is a view in perspective of a pair of the spring strips.

Fig. 5 is a front elevational view of a modified form of the spring member.

Fig. 6 is a transverse sectional view through the shade assembly, the section being taken on a plane indicated by the drawing 6—6 in Fig. 1.

Fig. 7 is a transverse sectional view through the shade assembly illustrating an alternate arrangement of the spring shown in Fig. 5; and Fig. 8 is a transverse sectional view through the shade assembly showing another modified form of the spring.

Referring first to Fig. 1, the shade assembly comprises generally a rectangular plate 10 of colored semi-transparent sheet stock, commercially known as Plexiglas, a flanged tube 11 secured to the upper marginal edge thereof, and an arm or rod 12 telescopically engaged by the tube 11. The rod is pivotally mounted in a bracket 13 designed for attachment to an inner wall of an automobile body above the windshield or in other similar environs. The tube 11 is slightly larger in diameter than the rod, the depending flanges 14 thereon being disposed in straddled engagement with the plate 10 and secured thereto by machine screws 15 and sleeved nuts 16. As illustrated in Figs. 1 and 2, a rod is greater in diameter than the thickness of the plate 10 and a pair of thin spring brass strips 17 are interposed between the inner face of one of the flanges 14 and the plate. The strips are approximately one half the length of the plate and are pierced to facilitate the support thereof by a pair of adjacent screws 15. The strips are wider throughout one half of their length and are arranged with the narrow portion thereof in overlapped relation during assembly, with the wider portions 18 protruding into the tube 11 tangential to the rod 12. Since the rod is of a greater thickness than the plate, the wider portions 18 of the resilient strips will be deformatively impinged against the rod and thus resist relative movement of the parts. The compressive effort imposed upon the rod may be regulated by adjustment of the screws 15.

If desired, the spring strips may be of rectangular form or fabricated with an arcuate relief in the lower edge thereof as shown in Fig. 5. In this embodiment the strips 20 are formed with straight lineal top edges engageable throughout their length with the rod 12. The strips are further formed with openings 21 therein for the screws 15 and a cut away bottom edge portion 22 to enhance the appearance of the assembly. As shown in Fig. 7 the spring strips of the form shown in Fig. 4 and/or the wing type illustrated in Fig. 5 may be placed under each flange 14 of the tube in straddled engagement with the rod 12 and if necessary, the gauge of the metal strips may be varied to compensate the weight of the plate 10.

In a modified form illustrated in Fig. 8 the spring 23 comprises a single leaf mounted between one of the flanges 14 and of the adjacent face of the plate 10. The upper portion of the spring in this embodiment is biased laterally towards the vertical axis of the rod 12, then upwardly and inwardly for intimate impinged engagement with a portion of the circumferential face of the rod.

Although the foregoing description is necessarily of a detailed character, in order that the invention may be completely set forth, it is to be understood that the specific terminology is not intended to be restrictive or confining, and that modifications of detail may be resorted to without departing from the scope or spirit of the invention as herein claimed.

What is claimed is:

1. A friction clamp for an adjustable windshield shade comprising a rectangular plate of a colored semi-transparent material, a flanged tube bolted to the upper edge thereof, a round rod in said tube constituting a supporting arm for the plate, said rod being of a greater diameter than the thickness of said plate, and flat spring metal strips mounted between said plate and the flanged portions of the tube with the free upper lineal edges thereof deformatively impinged with a portion of the round side wall of said rod throughout approximately one-half the length thereof.

2. A friction clamp for a rotatively adjustable windshield shade comprising a plate, a tube, depending flanges on said tube disposed in straddled relation with said plate and secured thereto, a round rod within said tube for the support of said shade, and a spring metal strip intermediate said plate and one of said flanges the upper free edge of said strip being tangentially and compressively engaged with a portion of the side wall of said rod.

3. A friction clamp for a rotatively adjustable sun shade comprising a plate of green semi-transparent plastic material, a flanged tube mounted on the upper edge thereof, a rod in said tube, a pair of spring sheet metal strips interposed between a flanged portion of said tube and said plate, portions of said strips being disposed in overlapped relation with each other with other portions thereof protruding into said tube and compressively engaged with a portion of the side wall of said rod.

4. A friction clamp for a rotatively adjustable sun shade comprising a rectangular plate having openings therein adjacent the upper marginal edge thereof, a tube of circular cross section, depending flanges thereon having openings therein, said flanges being disposed in straddled relation with said plate, bolts in said openings, a round rod telescopically engaged by said tube, spring metal strips having openings therein engaged with said bolts and disposed between said flanges and said plate, the upper portions of said strip being tangential said rod and compressively engaged therewith through adjustment of said bolts.

5. A sun shield for an automobile comprising a plate, a round rod for the support thereof, a channel enveloping said rod and mounted on said plate in straddled relation therewith and spring metal strips intermediate said plate and the flanged portions of said channel the upper edges of said strips being disposed in impinged relation with a portion of the side wall of said rod.

References Cited in the file of this patent

UNITED STATES PATENTS

| | | |
|---|---|---|
| 1,379,814 | Gustafson | May 31, 1921 |
| 2,204,691 | Olsen | June 18, 1940 |
| 2,220,429 | Soderberg | Nov. 5, 1940 |
| 2,264,603 | Westrope | Dec. 2, 1941 |
| 2,279,648 | Westrope | Apr. 14, 1942 |
| 2,299,775 | Westrope | Oct. 27, 1942 |

FOREIGN PATENTS

| | | |
|---|---|---|
| 574,526 | Great Britain | Jan. 9, 1946 |